March 19, 1963  R. F. J. FILIPOWSKY  3,082,377
COMBINATION GENERATOR AND DETECTOR
FOR A WAVE OF PREDETERMINED SHAPE
Filed July 30, 1959  2 Sheets-Sheet 1

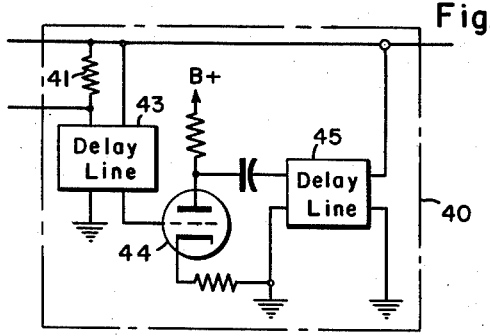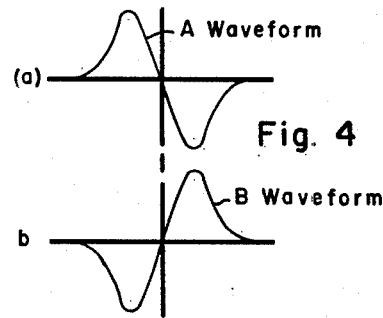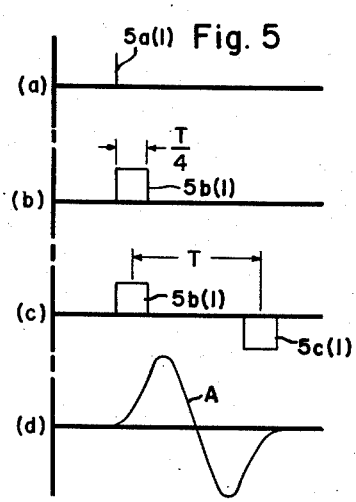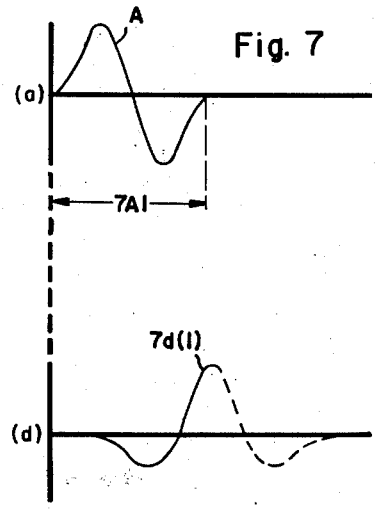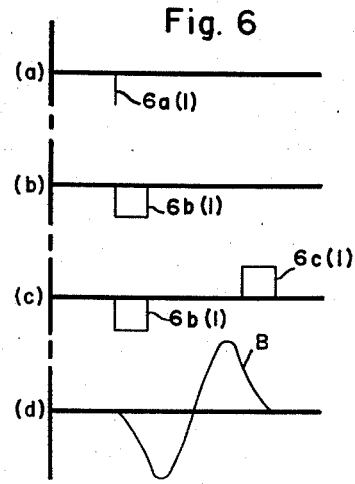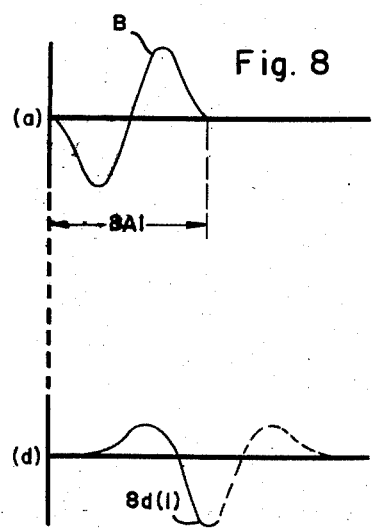

United States Patent Office 3,082,377
Patented Mar. 19, 1963

3,082,377
COMBINATION GENERATOR AND DETECTOR
FOR A WAVE OF PREDETERMINED SHAPE
Richard F. J. Filipowsky, Glen Burnie, Md., assignor to
Westinghouse Electric Corporation, East Pittsburgh,
Pa., a corporation of Pennsylvania
Filed July 30, 1959, Ser. No. 830,535
12 Claims. (Cl. 328—59)

This invention relates to a combination generator and detector for a wave of a predetermined shape and more specifically pertains to an optimum or matched filter for a wave of a predetermined shape.

A matched filter is an optimum linear device that produces, when subjected to an impulse at its input, a signal having a waveform to which it is matched. Additionally, the filter produces the highest instantaneous output voltage, at the end of input signal interval, when a signal to which it is matched is applied to the input. Circuits have previously been devised for filters matched to rectangular pulses. It has been determined that the signal to noise ratio at the output of these matched filters, is substantially greater than that realized with conventional filtering.

In my copending application Serial No. 833,450, filed August 13, 1959, and entitled "Signal Transmission System," assigned to the assignee of the present invention, and now abandoned, is disclosed a transmission system for accurately transmitting information. This copending application discloses a system wherein various discrete bipolar signals having symbolic waveforms are employed that pass the information accurately at a relatively high rate in a relatively small bandwidth.

Accordingly, it is an object of the invention to provide a matched filter for a bipolar signal particularly adapted to transmitting information.

Another object of the invention is the provision of a combination generator and extractor or detector for a bipolar signal having a predetermined waveform.

Another object of the invention is to provide a combination generator and detector, for a specific bipolar signal, that has a relatively large signal to noise ratio when detecting the waveform, in the presence of gaussian noise.

Still another object of the invention is the provision of a matched filter for a bipolar signal having symbolic waveform specially adapted for transmitting binary information.

A still further object of the invention is the provision of the matched filter which will generate or detect a bipolar symbolic signal having a waveform of predetermined shape.

An additional object of the invention is to provide a combination generator or detector that will selectively generate or detect one of two bipolar symbolic signals having predetermined waveforms.

It is also an object of the invention to provide an apparatus including a matched filter for two bipolar symbolic signals having predetermined waveforms which apparatus can selectively generate or detect one of the two waveforms with the detection having a relatively high signal to noise ratio and the apparatus being simple in construction and reliable in operation.

Other incidental objects of the invention will be apparent to those skilled in the art from the reading of the following specification and an inspection of the accompanying drawing, in which:

FIG. 3 illustrates another embodiment of the invention, shown in FIG. 1 with a portion thereof shown in block form;

FIG. 4 illustrates waveforms useful in describing the embodiment shown in FIGS. 1 to 3;

FIG. 5 illustrates waveforms occurring in the embodiment shown in FIGS. 1, 2 and 3 when the apparatus illustrated is employed as a waveform generator;

FIG. 6 illustrates waveforms occurring in an embodiment shown in FIGURES 1, 2 and 3 when the apparatus illustrated is employed as a waveform generator;

FIG. 7 illustrates waveforms occurring in the embodiment shown in FIGURES 1 through 3 when the apparatus illustrated is employed as an extractor or a detector; and FIG. 8 illustrates waveforms occurring illustrated in FIGS. 1, 2 and 3 when the apparatus illustrated is being employed as an extractor or detector.

Figure 1:
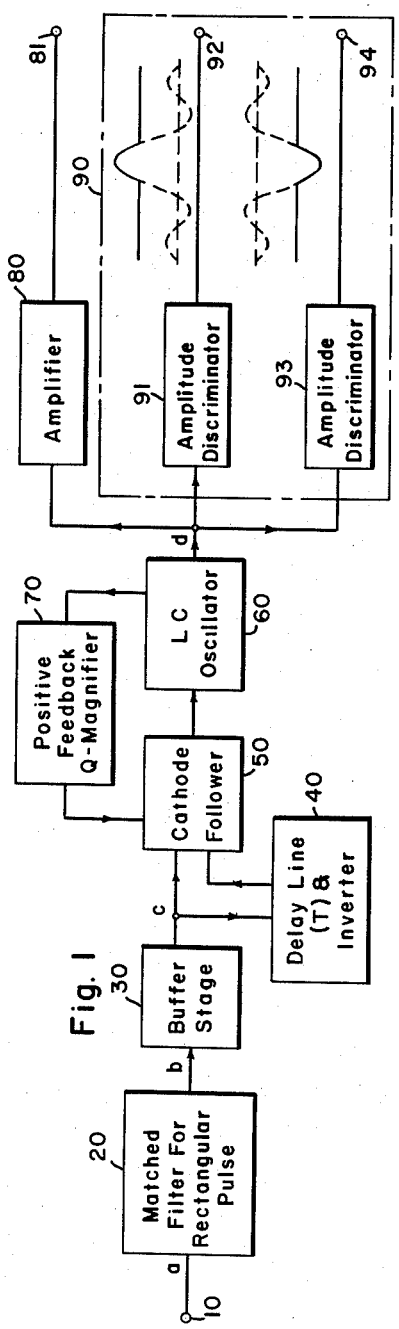
FIGURE 1 illustrates a schematic diagram in block form of an embodiment of the invention.

The embodiment of the invention illustrated in FIG. 1 is a matched filter or optimum linear device for extracting or detecting and generating a particular predetermined signal from noise. In my copending application mentioned above are disclosed two signals having waveforms which are illustrated in the present application in FIGURE 4, and are employed to transmit information. The apparatus shown in FIG. 1 is a matched filter for two of these waveforms which are illustrated in FIGS. 4(a) and 4(b) and will hereinafter be referred as A waveform and B waveform. The details and advantages of these waveforms in transmitting information is set forth in detail in the above mentioned application and will not be further explained in this application. A matched filter as stated above is a linear device that produces, when subjected to an impulse at its input, a waveform to which it is matched. Additionally, this filter produces the highest instantaneous output voltage at the end of an input signal interval if the waveform to which the filter is matched is submitted to the input. Accordingly, the embodiment illustrated in FIG. 1 is a matched filter for the waveforms illustrated in FIGS. 4(a) and 4(b).

Generally, the matched filter illustrated in FIG. 1 is operative to produce a signal with waveform A in response to a rectangular pulse resulting when a single positive polarity pulse is applied to the input terminal means 10. Conversely, a waveform B is produced in response to a single negative polarity pulse. Additionally, the same device acts as an extractor so as to produce the highest instantaneous output voltage at the end of the input signal, positive going when an A waveform is applied to the input terminals 1. When a B waveform is applied to the input terminals 10, the extractor will produce the highest instantaneous output voltage at the end of the input signal, negative going, at the output thereof.

More specifically, the embodiment shown in FIG. 1 comprises an input terminal means 10 through which a signal can be applied to a matched filter for a rectangular pulse 20. Such a match filter is illustrated in the article entitled "Matched Filters for Detecting Pulsed Signals in Noise," I.R.E. Convention Record, volume II, part 4, pages 30 through 35, 1954, by J. S. Rochefort.

This filter 20 has the characteristic of producing a rectangular output pulse of time length $$\frac{T}{4}$$

in response to a short time duration impulse. The polarity of these rectangular pulses depend upon the polarity of the input pulse applied to the filter. Additionally, this matched filter produces the highest instantaneous output voltage, when a rectangular pulse is applied thereto, at a time coincident with the end of the rectangular output pulse being applied to the input of the filter.

The matched filter 20 is connected to a buffer stage 30 with the output thereof being divided into two separate channels. The first signal channel applies the output of the buffer stage directly to a cathode follower 50. The second channel includes a delay line inverter 40 which delays a time T and inverts the output of the buffer stage 30 before it is applied to a cathode follower 50. The cathode follower passes these signals to an LC oscillatory circuit or network 60 which is a series resonant LC oscillator. A positive feedback loop connects the LC oscillator 60 back to the cathode follower 50 and includes a positive feedback Q magnifier or adjuster 70 which is operative to vary the Q of the LC network 60. The oscillator 60 is connected to an amplifier 80 to output terminal means 81 which are employed when the apparatus is to be utilized as a generator for the waveforms A and B shown in FIG. 4. Since the match filter produces a maximum instantaneous output voltage at the end of the signal being applied at the input, this extractor characteristic can be utilized so as to operate effectively as a detector of the two signals A and B. Since the maximum instantaneous amplitude will be either negative or positive going depending upon which of the waveforms A or B is applied to the input terminal means 10, a positive limiter or clipper 91 and a negative limiter or clipper 93 which form a portion of the detector means 90, is connected to the output of the oscillator 60 so as to determine at the output terminal means 92 and 94, respectively, which of the two waveforms A or B have been applied to the input terminal means 10.

Figure 2:
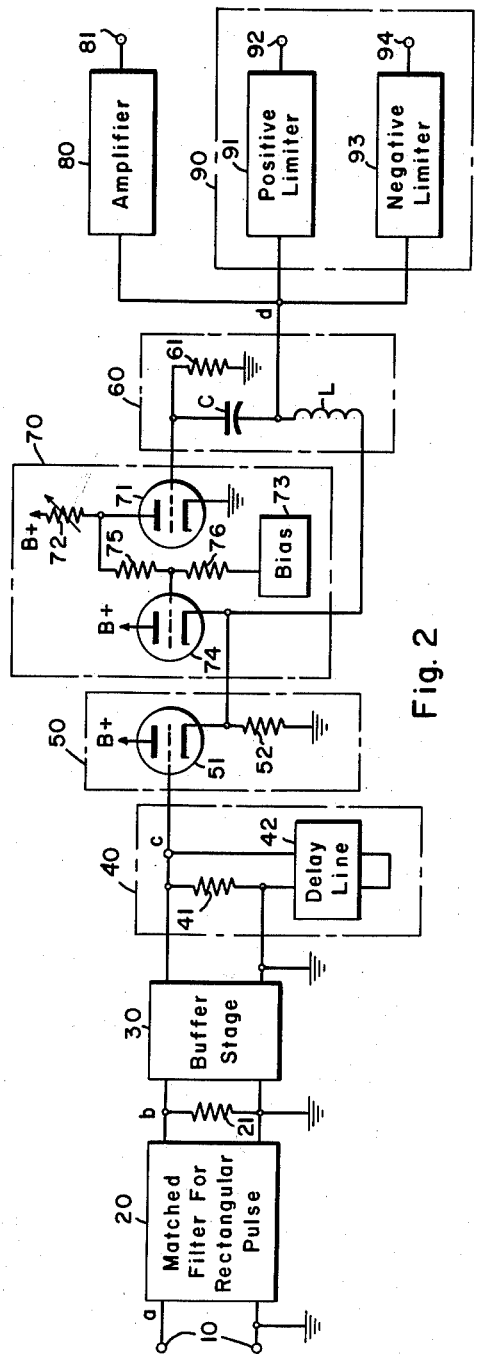
FIG. 2 illustrates the embodiment shown in FIG. 1 with a portion thereof shown in block form.

A more specific showing of the apparatus shown in FIG. 1 is illustrated in FIG. 2. The matched filter 20 is connected to the buffer stage 30 through a load resistor 21. As further shown in FIG. 2 the buffer stage 30 is connected to delay line inverter 40. This delay line and inverter means 40 comprises a matching resistor 41 which is connected across the output of the buffer stage 30. The resistor 41 is matched to prevent a delayed signal from being reapplied through the delay line. One end of the matching resistor 41 is grounded. Also connected across the matching resistor 41 is a delay line 42 which delays the signal passing therethrough and also reverses its polarity. The output of the buffer stage 30 as well as the ungrounded end of the delay line 42 is connected to a signal grid of the cathode follower 50. The cathode follower 50 includes a vacuum tube 51 having a signal grid which is connected to the buffer stage 30 and the ungrounded end of delay line 42. The cathode of triode 51 is connected to a low impedance cathode resistor 52 which has its other end grounded. It is thus seen that two signal paths are provided to the cathode follower tube 51 one directly from the buffer stage 30 and the other through the delay line 42 which delays and inverts the signal passing through there. These signals are reflected across the cathode resistor 52 which thence applied to the LC series resonant oscillatory circuit 60. As shown in FIG. 2, an inductor L, capacitor C and resistor 61 are connected in series with the cathode resistor 52 to thereby form a series resonant oscillatory circuit. The cathode follower will apply the signal to the LC network 60.

A positive feedback 70 is provided for the oscillator 60 so as to adjust the Q value of this circuit to an optimum maximum without causing self-oscillation. The feedback loop 70 includes triodes 71 and 74 which operate to provide a positive feedback to the cathode resistor 52 without phase distortion. The cathode of triode 71 is grounded whereas the control grid thereof is connected between the capacitor C and the resistor 61. A variable plate resistor 72 is connected to the plate of triode 71. This variable resistor 72 can be adjusted so as to vary the positive feedback. The plate of triode 71 is connected through a resistor 75 to the control grid of triode 74 so as to transmit the feedback signal thereto. A bias 73 is connected through a resistor 76 to the control grid of triode 74 to provide a bias thereto. The cathode of triode 74 is in turn connected to the cathode of tube 51 and the cathode resistor 52. Thus the tube 74 completes the positive feedback group to the cathode resistor 52 so that upon adjusting the variable resistor 72 this feedback can be varied so as to vary the Q value of the resonant circuit 60 and make the Q value thereof sufficiently high without causing self-oscillation therein.

The voltage appearing across the capacitor C and the resistor 61 is applied to an amplifier 80 having output terminals 81. As will be discussed later, the output terminals 81 provide an output when the matched filter is employed as a generator. The input of the amplifier 80 is connected between the inductor L and the capacitor C. Also connected between the inductor L and the capacitor C is a decision means 90 which will be explained later, is employed when it is desired to utilize the match filter as a detector. The decision means 90 includes a positive amplitude discriminator 91 having output terminals 92 which as shown in FIG. 1 will detect the polarity of the maximum instantaneous output when the output is positive going. Also connected between the condenser C and the inductor L is a negative amplitude discriminator 93 having output terminals 94 which will determine the polarity of the maximum instantaneous output of the negative going output voltage from the oscillator 60. As will be explained in more detail, these two amplitude discriminators 91 and 92 operate to detect or discriminate between the waveforms which are illustrated in FIG. 4.

The embodiment shown in FIG. 3 is the same as the embodiment shown in FIG. 2 with the exception of the delay line and inverter unit 40. The delay line in inverter means 40 shown in FIG. 3, employs a tandem circuit of an even number of line segments with a total delay time of one signal duration connecting each line segment to the next over a booster stage which provides 180° phase reversal. As shown in FIG. 3, the delay line and inverter means 40 includes an impedance matching resistor 41 connected across the buffer stage 30. The embodiment shown in FIG. 2 employs a shorter delay line 42 to provide the delay in inversion for the signal through the second signal channel. In the embodiment shown in FIG. 3, however, a delay line 43 is employed the input of which is connected across the impedance matching resistor 41 with the output having one terminal grounded and the other output terminal connected to the signal grid of a phase reversing tube or stage 44. The stage 44 provides inversion of the signal and applies it to a second delay line 45 which has one input terminal and one output terminal grounded. The stage 44 provides amplification for loss during passage through the second signal channel and this amplification of course can be varied to provide an optimum output at the output of the second signal channel. One of the output terminals of the delay line 45 is then in turn connected to the signal grid of triode 51 so as to apply the output of this second channel to the grid with the desired delay of T and the desired inversion of this signal. The embodiment shown in FIG. 3 can be employed when a loss less delay line is desired. Depending upon the circuit employed the embodiment shown in FIG. 2 can be employed when the loss through the delay line 42 is negligible or insignificant.

*Operation*

The operation of the embodiment shown in FIGS. 2 and 3 will be the same insomuch as the only difference between these two embodiments is the difference in the delay line and inverter 40. As explained above, the subject invention pertains to a matched filter for the waveforms shown in FIG. 4. That is, the apparatus disclosed is a matched filter which is a linear device that produces when subjected to an impulse at its input, the waveform to which the filter is matched. Additionally, the filter produces the highest instantaneous output voltage at the end of the input signal time interval of the input waveform, if the waveform to which the filter is matched is submitted or applied to the input. Hence, the matched filter can be employed either as a waveform generator or an extractor or detector. FIG. 1 identifies four points in the system illustrated as *a*, *b*, *c* and *d*. The waveforms occurring at these points during the operation of the apparatus as a generator, is shown in FIGS. 5 and 6. If it is decided to employ the matched filter as the generator to produce the A type waveform a relatively short duration positive going pulse is applied to the input terminals 10 as shown in FIG. 5(*a*). The resulting output from the matched filter for a rectangular pulse 20 will be a rectangular pulse as shown in FIG. 5(*b*). This first positive going rectangular pulse is a time length of $$\frac{T}{4}$$

and will be applied through a buffer stage 30 directly to the cathode follower 15 and also through the delay line in inverter 40. The delay line and inverter 40 representing a second signal path to invert and delay the pulse 5*b*(1) will have an output pulse 5*c*(1) which is rectangular in shape and delayed a time T from the pulse 5*b*(1). As discussed in more detail in my copending application Serial No. 731,915 filed April 30, 1958, and entitled "Generator for Signals Having Skew Sine Waveforms" such a waveform, as shown in FIG. 5(*c*), when applied to a resonant circuit will produce a waveform A shown in FIG. 5(*d*). In the present apparatus the waveform shown in FIG. 5(*c*) is applied through a cathode follower or a low impedance means to the series resonant oscillator 60. The leading positive going rectangular shape pulse 5*b*(1) is applied to the LC oscillator 60 to set the resonant circuit into oscillation. The tailing negative going rectangular pulse 5*c*(1) dampens this circuit and terminates the oscillation thereof so as to produce the waveforms shown in FIG. 5(*d*). The values of this LC oscillator 60 are selected to produce the waveform desired in accordance with the time interval of delay desired. The output of this matched filter when employed as a waveform generator will appear at the output terminals 81 to thereafter be employed in the transmission system disclosed in my copending application entitled "Signal Transmission System."

If it is desired to use the matched filter as a generator to produce the B type waveform shown in FIG. 4(*b*), a negative going short duration pulse 6*a*(1) is applied to the input terminals 10 and thence to the matched filter 20. FIG. 6 illustrates the waveforms occurring in points *a*, *b*, *c* and *d* shown in FIG. 1 as is illustrated in FIGS. 6(*a*), (*b*), (*c*) and (*d*) respectively. When the negative going pulse such as that shown in FIG. 6(*a*) is applied to the matched filter 20 the resulting output from the filter 20 is a negative going rectangular pulse 6*b*(1) shown in FIG. 6(*b*). This pulse is applied through buffer stage 30 to the cathode follower 50 and also through a second signal channel including a delay line in inverter 40. The output of the second signal channel is a positive going pulse 6*c*(1) which is delayed a time period T after the negative going pulse 6*b*(1) is applied to the delay line in inverter 40. This positive going pulse 6*c*(1) is also applied to the cathode follower 50. The negative going pulse 6*b*(1) is applied through a cathode follower to the LC oscillator 60 to set the series resonant circuit into oscillation. The positive going pulse 6*c*(1), delayed at time T after the negative going pulse 6*b*(1), opposes the oscillation of the series resonant oscillator 60 and forces it back to a quiescent state terminating the oscillation thereof. The result in output waveform at *d* shown in FIG. 1 is a waveform B which is illustrated in FIGS. 6(*d*) and 4(*b*) which appears at the output terminals 81.

Hence it can be seen that the matched filter disclosed will produce an A type waveform or a B type waveform depending upon the polarity of the pulse applied to the input terminals 10.

As explained above the matched filter disclosed can also be employed as an extractor and detector for the waveforms A and B shown in FIG. 4. The waveforms occurring when the matched filter is employed as an extractor or detector at points *a* and *d* are shown in FIGS. 7 and 8(*a*) and (*d*) respectively. If a waveform type A is applied to the matched filter for a rectangular pulse 20, as shown in FIG. 7(*a*), the output therefrom will be applied to the cathode follower 50 and also to the cathode follower 50 after passing through the delay line in inverter 40. The result or composite of the output of these two signal channels is then applied through the cathode follower 50 to the LC oscillator 60. Since the filter is matched to the waveform the maximum amplitude of the output waveform shown in 7D is at a point 7*d*(1) which corresponds in time to the end of the input waveform A which ends at a point of time 7A1. This maximum amplitude of this output waveform occurring at a time coincident with the end of the input waveform, is positive going, and can be detected as such by passing the signal through a positive amplitude discriminator 91 whose threshold is sufficiently high to detect only the maximum amplitude of this waveform having a positive going polarity.

If the inverse of waveform A, that is waveform B, is applied to the matched filter 20, the resulting waveforms 8*d*(1) have a maximum amplitude at a time occurring at the end of the application of the B waveform, illustrated as 8A1 to the matched filter 20. As can be seen, however, the output of the extractor at point D in this case has a maximum amplitude of which is negative going. Since the B waveform can be detected by passing the output of the oscillator 60 through a negative amplitude discriminator 93 that will have a negative threshold sufficiently high to pass only the peak amplitude.

Summarizing briefly the matched filter disclosed can be operated as a generator for the A type waveform by applying a short duration positive going pulse to the input thereof. By applying a negative going short duration pulse to the input of the matched filter the B waveform will be produced. Additionally, the filter can be employed as an extractor and detector of either of these two waveforms and the output detected through limiters so as to sample or test the polarity of the maximum amplitude thereof.

Whereas the invention has been shown and described with respect to embody its limits thereof which give satisfactory results, it should be understood that changes may be made and equipments substituted without departing from the spirit and scope of the invention.

I claim as my invention:

1. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, a first signal channel operatively connecting the output of said filter to said oscillator, and a second signal channel operatively connecting the output of said filter to said oscillator means and including means for delaying and inverting the signal being passed therethrough.

2. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, a first signal channel operatively connecting the output of said filter to said oscillator and including a low impedance means, a second signal channel operatively connecting the output of said filter to said oscillator means and including a delay line for delaying and inverting the signal being passed therethrough.

3. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, low impedance means operatively connecting the output of said filter to said oscillator, and means operatively connecting the output of said filter to said oscillator means and including means for delaying and inverting the signal being passed therethrough.

4. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, a first signal channel comprising a low impedance means operatively connecting the output of said filter to said oscillator, a second signal channel operatively connecting the output of said filter to said oscillator means and including means for delaying and inverting the signal being passed therethrough, a variable positive feedback loop connected between said oscillator means and said low impedance means for varying the output of said oscillator means.

5. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, a first signal channel including a cathode follower operatively connecting the output of said filter to said oscillator, and a second signal channel operatively connecting the output of said filter to said cathode follower including means for delaying and inverting the signal being passed therethrough.

6. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, a first signal channel including cathode follower means operatively connecting the output of said filter to said oscillator, a second signal channel operatively connecting the output of said filter to said oscillator means and including a delay line operatively connected between said filter and said cathode follower for delaying and inverting the signal being passed through said second channel, a positive feedback loop connected between said oscillator and said cathode follower.

7. A combination waveform generator and detector comprising a matched filter responsive to the polarity of an input pulse when applied thereto for providing a rectangular pulse output and for producing the highest instantaneous output at a time coincident with the end of a waveform when applied thereto, oscillator means, comprising a capacitance and an inductance means, a first signal channel including a cathode follower means having a cathode follower impedance means, said filter being operatively connected to said cathode follower, said cathode follower impedance means connected in series with said inductance and said capacitance means to form a series LC oscillating circuit, a second signal channel operatively connecting the output of said filter to the input of said cathode follower means and including a delay line for delaying and inverting the signal being passed through said second signal channel, and a variable positive feedback loop operatively connected between said oscillatory circuit and said cathode follower impedance means for varying the Q of said oscillatory circuit.

8. In an electrical system the combination comprising a matched filter responsive to the polarity of an input pulse when applied thereto for providing a rectangular pulse output and for producing the highest instantaneous output at a time coincident with the end of a waveform when applied thereto, oscillator means, a first signal channel operatively connecting the output of said filter to said oscillator, a second signal channel operatively connecting the output of said filter to said oscillator and including means for delaying and inverting the signal being passed through said second channel, and amplitude discriminating means operatively connected to the output of said oscillator.

9. In an electrical system the combination comprising a matched filter responsive to the polarity of an input pulse when applied thereto for providing a rectangular pulse output and for producing the highest instantaneous output at a time coincident with the end of a waveform when applied thereto, oscillator means, a first signal channel operatively connecting the output of said filter to said oscillator, a second signal channel operatively connecting the output of said filter to said oscillator means and including means for delaying and inverting the signal being passed through said second channel, and means for detecting the polarity of the maximum amplitude of the output of said oscillator means.

10. In an electrical system the combination comprising a matched filter responsive to the polarity of an input pulse when applied thereto for providing a rectangular pulse output and for producing the highest instantaneous output at a time coincident with the end of a waveform when applied thereto, oscillator means comprising an inductance means and a capacitance means, to form a series resonant oscillatory circuit, a first signal channel including low impedance means operatively connecting the output of said filter to said oscillatory circuit, a second signal channel operatively connecting the output of said filter to said oscillator means and including a delay line for delaying and inverting the signal being passed through said second signal channel, a positive feedback loop connected between said oscillatory circuit and said low impedance means for varying the Q of said oscillatory circuit, and means for detecting the polarity of the maximum amplitude of the output of said oscillatory circuit.

11. A detector for detecting a waveform of a predetermined shape comprising a matched filter responsive to the polarity of an input pulse when applied thereto for providing a rectangular pulse output and for producing the highest instantaneous output at a time coincident with the end of a waveform when applied thereto, oscillator means including an inductance means and a capacitance means, a first signal channel including a cathode follower means operatively conecting the output of said filter to said oscillator, said cathode follower means including a cathode follower resistor, said cathode follower resistor, said inductance means and said capacitance means being connected in series to provide a series resonant oscillatory circuit, a second signal channel operatively connecting the output of said filter to said cathode follower means and including means for delaying and inverting the signal being passed through said second channel, a positive feedback loop operatively connected between said oscillatory circuit and said cathode follower resistor for varying the Q in said oscillatory circuit, and means for detecting the polarity of the maximum output of said oscillatory circuit.

12. A detector for detecting a waveform of a predetermined shape comprising a matched filter responsive to the polarity of an input pulse when applied thereto for providing a rectangular pulse output and for producing the highest instantaneous output at a time coincident with the end of a waveform when applied thereto, oscillator means including inductance means and capacitance means, a first signal channel operatively connecting the output of said filter to said oscillator and including cathode follower means having a cathode follower resistor, said cathode follower resistor being connected in series with said inductance means and said capacitance means to form a series resonant oscillatory circuit, a second signal channel operatively connecting the output of said filter to said cathode follower means and including a delay line for delaying and inverting the signal being passed through said second channel, a positive feedback loop connected between the said oscillatory circuit and said cathode follower resistor for varying the Q of said oscillatory circuit, and amplitude discriminating means operatively connected to said oscillatory circuit for determining the polarity of the maximum output of said oscillatory circuit.

References Cited in the file of this patent

UNITED STATES PATENTS

| | | |
|---|---|---|
| 2,436,662 | Norgaard | Feb. 24, 1948 |
| 2,444,438 | Grieg | July 6, 1948 |
| 2,689,299 | Anderson | Sept. 14, 1954 |
| 2,743,363 | Mautner et al. | Apr. 24, 1956 |

FOREIGN PATENTS

| | | |
|---|---|---|
| 450,115 | Canada | July 17, 1948 |